US008060651B2

(12) United States Patent
Deshpande et al.

(10) Patent No.: US 8,060,651 B2
(45) Date of Patent: Nov. 15, 2011

(54) SYSTEMS AND METHODS FOR ADAPTIVELY PACKETIZING DATA PARTITIONS FOR TRANSPORT OVER A NETWORK

(75) Inventors: Sachin G. Deshpande, Vancouver, WA (US); Quan Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1009 days.

(21) Appl. No.: 11/465,407

(22) Filed: Aug. 17, 2006

(65) Prior Publication Data
US 2008/0046588 A1  Feb. 21, 2008

(51) Int. Cl.
G06F 15/16  (2006.01)
(52) U.S. Cl. ....................................... 709/246
(58) Field of Classification Search ............. 709/246
See application file for complete search history.

(56) References Cited

U.S. PATENT DOCUMENTS

| | | | | |
|---|---|---|---|---|
| 6,680,976 | B1* | 1/2004 | Chen et al. | 375/240.26 |
| 7,096,272 | B1* | 8/2006 | Raman | 709/231 |
| 7,274,742 | B2* | 9/2007 | Balakrishnan et al. | 375/240.26 |
| 2005/0259690 | A1* | 11/2005 | Garudadri et al. | 370/477 |
| 2007/0086481 | A1* | 4/2007 | Klemets | 370/466 |

FOREIGN PATENT DOCUMENTS

| | | |
|---|---|---|
| JP | 2002112265 | 4/2002 |
| JP | 2003023639 | 1/2003 |
| JP | 2004304843 | 10/2004 |
| JP | 2005123907 | 5/2005 |
| WO | 02/069643 | 9/2002 |

OTHER PUBLICATIONS

"ITU-T recommendation Advanced video coding for generic audio-visual services (ITU-T Rec. H.264/ISO/IEC 14 496-10 AVC," 2004, http://www.itu.int/rec/dologin_pub.asp?lang=e&id=T-REC-H.264-200503-I!!PDF-E&type=items.
"RTP payload format for H.264 Video," Wenger et al., RFC 3984, http://www.ietf.org/rfc/rfc3984.txt.
"RTP Header Compression," http://www.ietf.org/html.charters/rohc-charter.html.

* cited by examiner

*Primary Examiner* — Jeffrey Pwu
*Assistant Examiner* — Saad A Waqas
(74) *Attorney, Agent, or Firm* — Austin Rapp & Hardman

(57) ABSTRACT

In an exemplary embodiment, an RTP packetization component receives data partitions corresponding to a single slice of coded data from an H.264 encoder. The RTP packetization component evaluates a first set of conditions in order to determine whether to merge the data partitions into a single packet for transport over a network or to include the data partitions in separate packets for transport over the network. If it is determined that each condition within the first set of conditions is satisfied, the data partitions are merged into the single packet. If any condition within the first set of conditions is not satisfied, the data partitions are included in the separate packets.

19 Claims, 9 Drawing Sheets

ALTERNATIVE B

SYSTEMS AND METHODS FOR ADAPTIVELY PACKETIZING DATA PARTITIONS FOR TRANSPORT OVER A NETWORK

TECHNICAL FIELD

The present invention relates generally to computers and computer-related technology. More specifically, the present invention relates to systems and methods for adaptively packetizing data partitions for transport over a network.

BACKGROUND

Video compression is the process of compacting or condensing a digital video sequence into a smaller number of bits. Because uncompressed digital video typically requires a large bit-rate, video compression is often necessary for practical storage and transmission of digital video. Video compression is used in connection with a wide range of applications, such as digital television, Internet streaming video, DVD video, and so forth.

Video compression is achieved by removing redundancy. There are at least two types of redundancy that may be exploited to achieve video compression: temporal redundancy and spatial redundancy. Temporal redundancy refers to similarities between temporally adjacent frames, i.e., frames that succeed one another in time. Spatial redundancy refers to similarities within the same frame. Most video compression methods attempt to eliminate both temporal and spatial redundancy.

A video compression system typically includes an encoder and a decoder. The encoder converts the source video data (i.e., the video data to be stored, transmitted, etc.) into a compressed form. The decoder converts the compressed form back into a representation of the original video data. The encoder/decoder pair is often referred to as a codec.

H.264 (also known as MPEG-4 Part 10, or AVC, for Advanced Video Coding) is a video compression standard that was written by the ITU-T Video Coding Experts Group (VCEG) together with the ISO/IEC Moving Picture Experts Group (MPEG) as the product of a collective partnership effort known as the Joint Video Team (JVT). H.264 contains a number of features that allow it to compress video much more effectively than older standards.

One of the features that H.264 provides is known as data partitioning. Data partitioning is a useful error resilience tool when transmitting video under error-prone conditions. Data partitioning allows the use of unequal error protection so that more important data is given more protection than less important data.

The Real-Time Transport Protocol (RTP) is a protocol standard for the transport of real-time data, including audio and video, over either unicast or multicast networks. RTP is used in virtually all voice-over-IP architectures, for videoconferencing, media-on-demand, and other applications. A thin protocol, RTP supports content identification, timing reconstruction, and detection of lost packets.

At low bit-rates when using RTP for H.264 video transmission and when using H.264 data partitioning, high overhead due the headers can occur. The present disclosure relates to techniques for addressing this issue.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
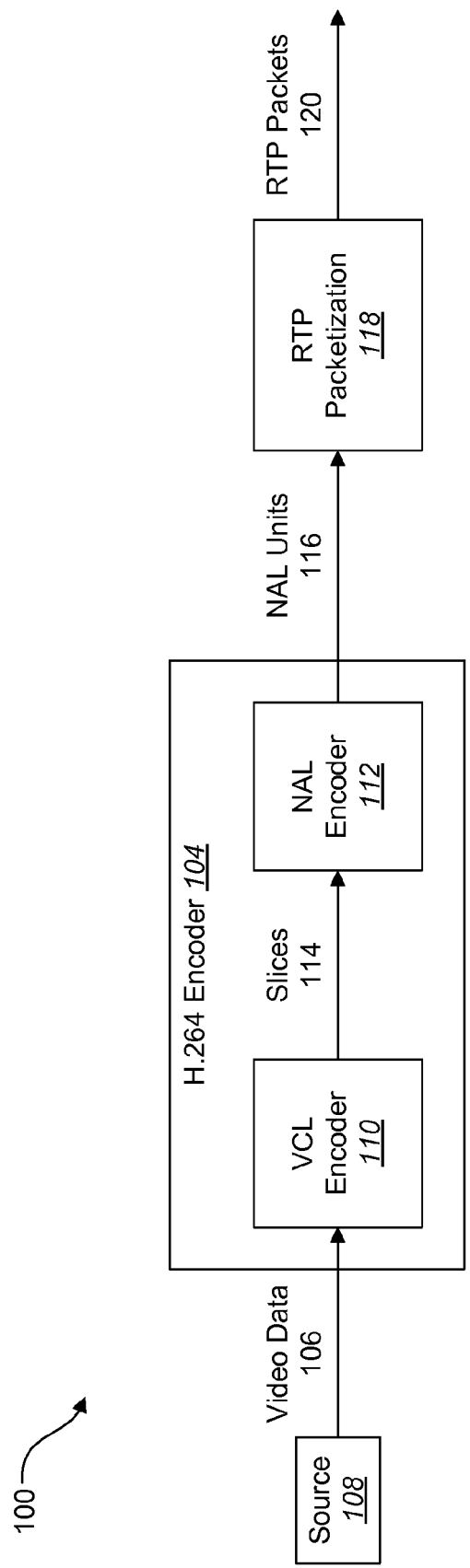
FIG. 1 illustrates an exemplary system in which embodiments may be practiced, the system including an encoder (comprising a VCL encoder and a NAL encoder) and an RTP packetization component.

A method for adaptively packetizing data partitions for transport over a network is disclosed. The method involves receiving the data partitions. The data partitions correspond to a single slice of coded data. The method also involves evaluating a first set of conditions in order to determine whether to merge the data partitions into a single packet for transport over the network or to include the data partitions in separate packets for transport over the network. The method also involves merging the data partitions into the single packet if it is determined that each condition within the first set of conditions is satisfied. The method also involves including the data partitions in the separate packets if it is determined that any condition within the first set of conditions is not satisfied.

In an embodiment, if each condition within the first set of conditions is satisfied, the method also involves evaluating a second set of conditions to determine whether to combine the data partitions with other data partitions corresponding to one or more other slices. If each condition within the second set of conditions is satisfied, the method may also involve combining the data partitions with the other data partitions corresponding to the one or more other slices.

The first set of conditions may be evaluated in response to receiving the data partitions. The first set of conditions may include a condition that $bC(j)(i)$ is less than a threshold value. The second set of conditions may include a condition that $bA(j)(i)+bB(j)(i)+bC(j)(i)$ is less than a threshold value. The second set of conditions may also include a condition that $bA(j)(i+1)+bB(j)(i+1)+bC(j)(i+1)$ is less than a threshold value.

In an embodiment, the data partitions are received from an encoder. The encoder may be an H.264 encoder.

Each data partition may be contained within a separate Network Abstraction Layer (NAL) unit. The single packet and the separate packets may each be Real-Time Transport Protocol (RTP) packets.

A computer-readable medium comprising executable instructions for implementing the above method for adaptively packetizing data partitions for transport over a network is also disclosed. A computing device that is configured to implement the above method for adaptively packetizing data partitions for transport over a network is also disclosed. The computing device includes a processor and memory in electronic communication with the processor. Instructions are stored in the memory. The instructions are executable to implement the above method for adaptively packetizing data partitions for transport over a network.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 illustrates an exemplary system 100 in which embodiments may be practiced. The system 100 includes an encoder 104. As discussed above, the encoder 104 converts uncompressed video data 106 from a video source 108 into a compressed video data, which may be transmitted to a remote destination and/or stored in a storage device, as desired.

In the embodiment that is depicted in FIG. 1, the encoder 104 is an H.264 encoder 104. This means that the encoder 104 conforms to the requirements of a version of the ITU-T H.264 standard. In an alternative embodiment, another type of encoder may be used.

The H.264 standard distinguishes conceptually between a video coding layer (VCL) and a network abstraction layer (NAL). The VCL contains signal processing functionality and has the general structure of many conventional video codecs, i.e., it is a macroblock-based coder that uses inter-picture prediction with motion compensation and transform coding of the residual signal. The NAL defines the interface between the VCL and the outside world.

The H.264 encoder 104 that is shown in FIG. 1 includes a VCL encoder 110 and a NAL encoder 112. The VCL encoder 110 receives uncompressed video data 106 as input, and outputs a sequence of slices 114. A slice 114 is a bit string that contains the macroblock data of an integer number of macroblocks, and the information of the slice header (containing the spatial address of the first macroblock in the slice 114, the initial quantization parameter, and similar information). The NAL encoder 112 encapsulates the slices 114 that are output by the VCL encoder 110 into NAL units 116.

The system 100 also includes a Real-Time Protocol (RTP) packetization component 118. As discussed above, RTP is a protocol standard for the transport of real-time data, including audio and video, over packet-oriented networks (e.g., the Internet). The RTP packetization component 118 implements one or more features of RTP.

The NAL units 116 that are output by the NAL encoder 112 are provided to the RTP packetization component 118. The RTP packetization component 118 maps the NAL units 116 that it receives to RTP packets 120, which are suitable for transmission over packet networks or use in packet-oriented multiplex environments.

As mentioned above, one of the features that H.264 provides is known as data partitioning. In accordance with H.264 data partitioning, the coded data that makes up a slice 114 is placed in three separate data partitions, which are referred to as data partition A, data partition B, and data partition C. Data partition A contains the header information such as macroblock types, quantization parameters, and motion vectors. Data partition B contains Intra Coded Block Patterns (CBPs) and transform coefficients of I-blocks. Data partition C contains Inter CBPs and coefficients of P-blocks.

Figure 2:
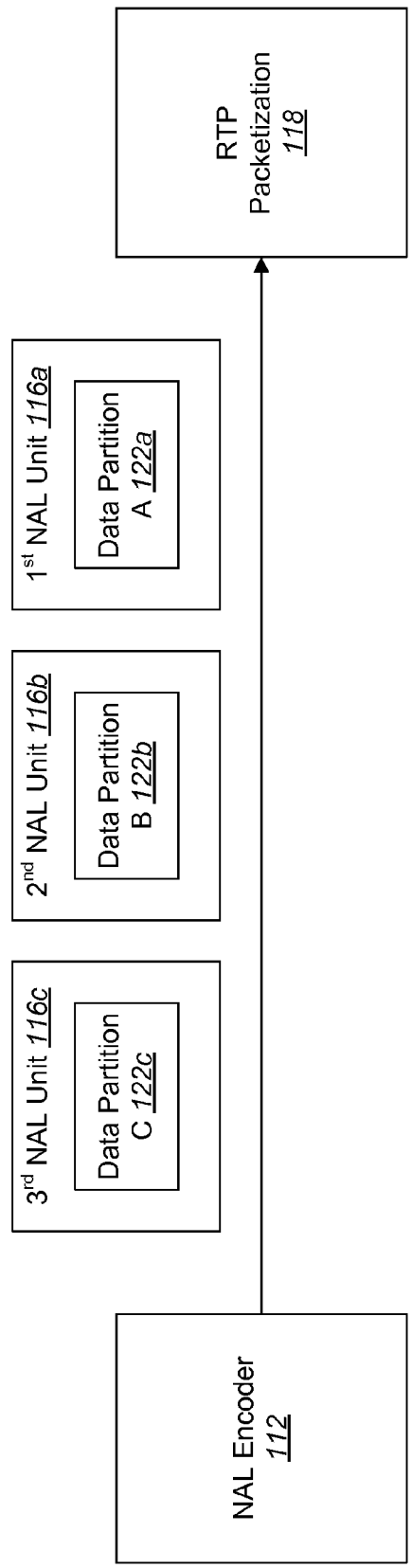
FIG. 2 illustrates an exemplary way that the NAL encoder in the system of FIG. 1 may organize data partitions that correspond to the same slice within separate NAL units.

As shown in FIG. 2, when the H.264 encoder 104 is performing data partitioning, the NAL encoder 112 includes the different data partitions 122a, 122b, 122c that correspond to the same slice 114 in separate NAL units 116a, 116b, 116c. In particular, the coded data corresponding to data partition A 122a is included in a first NAL unit 116a, the coded data corresponding to data partition B 122b is included in a second NAL unit 116b, and the coded data corresponding to data partition C 122c is included in a third NAL unit 116c. These three separate NAL units 116a, 116b, 116c, each corresponding to the same slice 114, are provided to the RTP packetization component 118.

Figure 3:
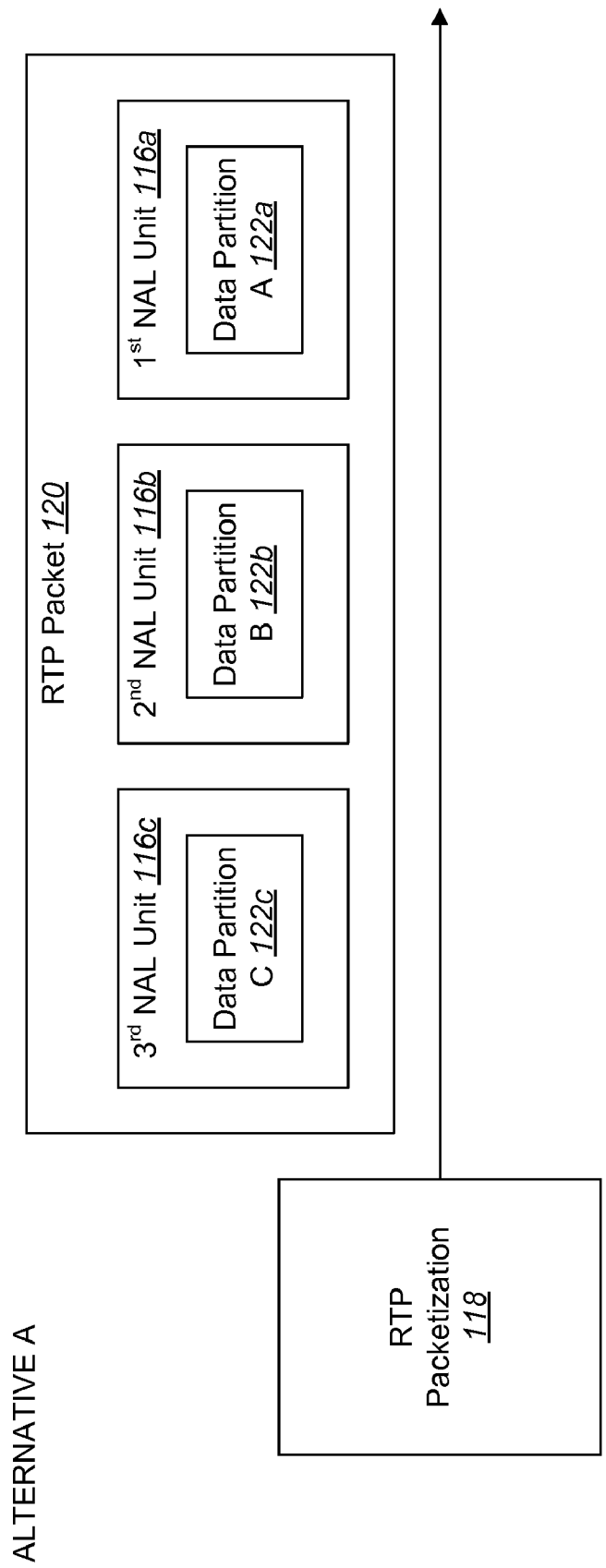
FIG. 3 illustrates an exemplary way that the RTP packetization component in the system of FIG. 1 may map the NAL units that correspond to a particular slice into an RTP packet.
Figure 4:
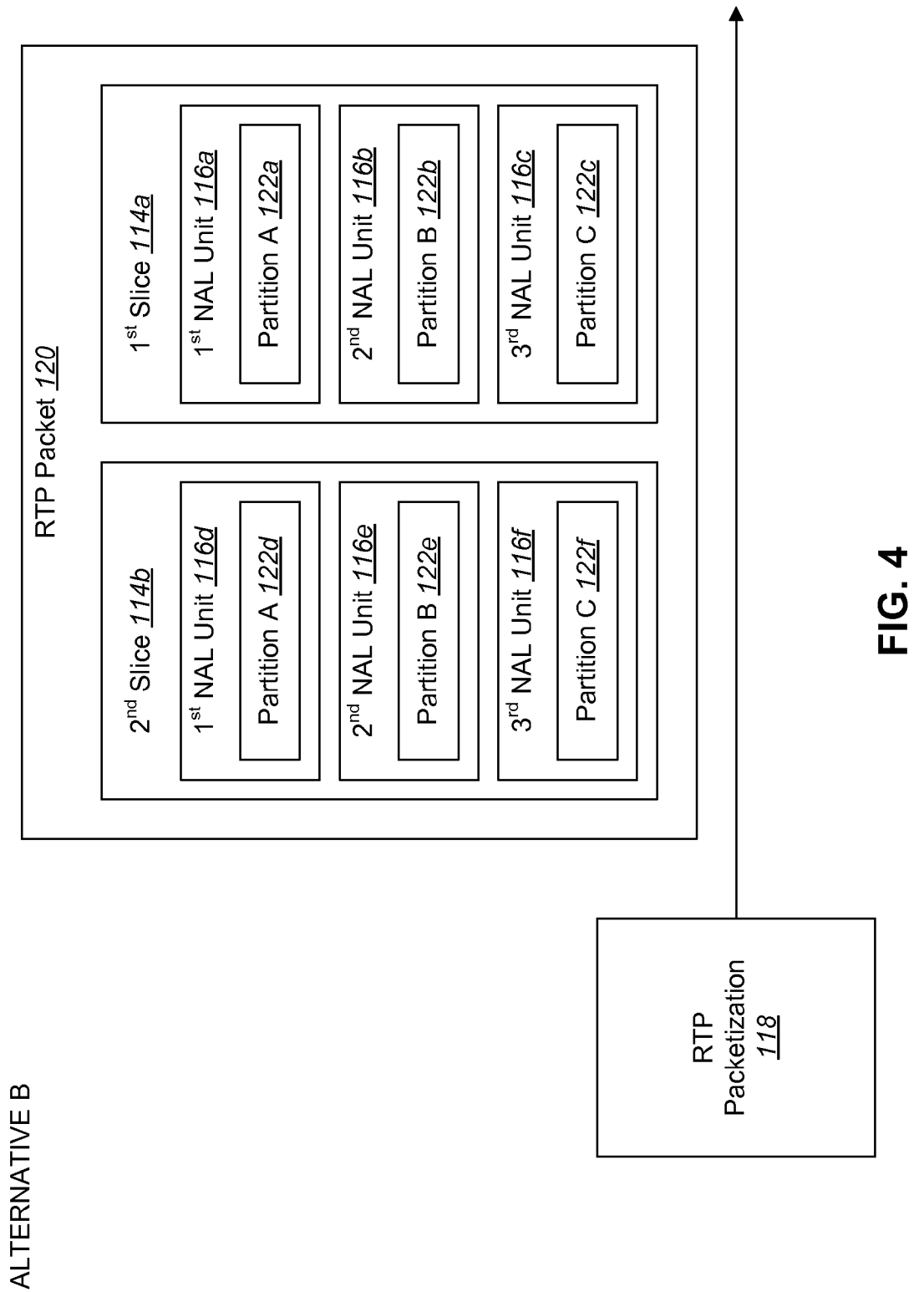
FIG. 4 illustrates another exemplary way that the RTP packetization component may map the NAL units that correspond to a particular slice into an RTP packet.
Figure 5:
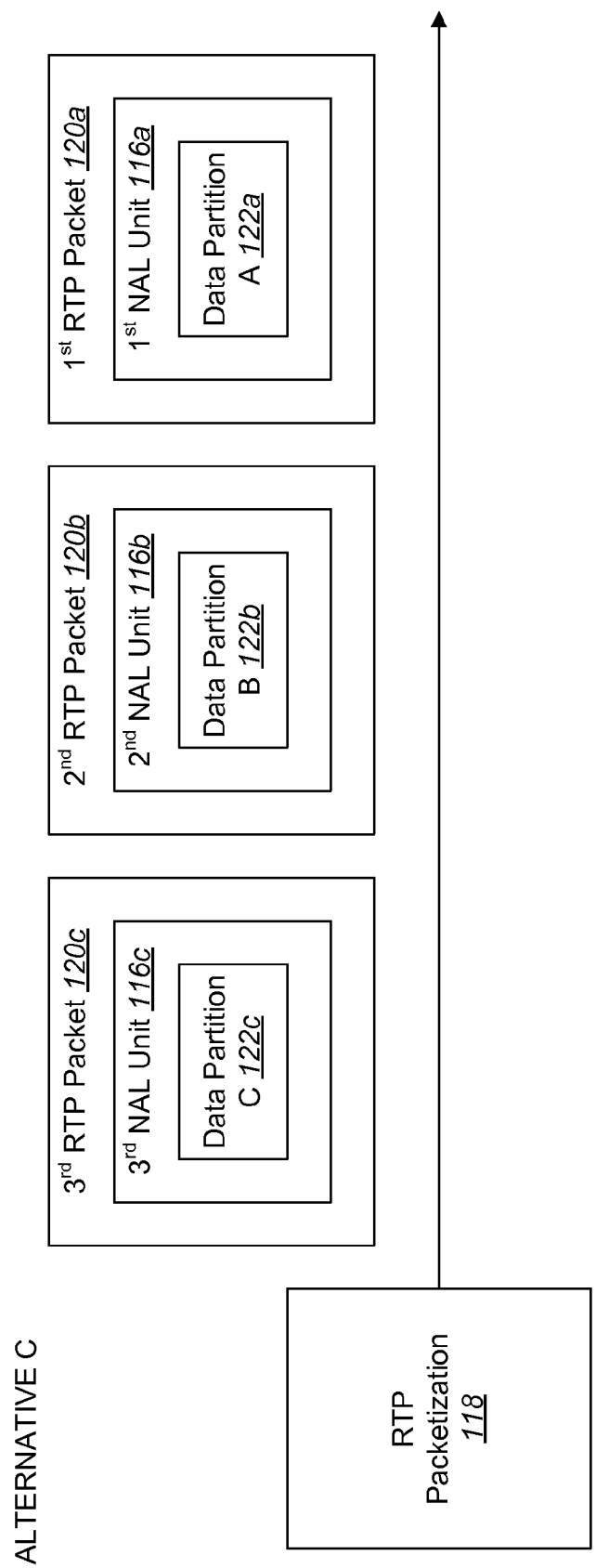
FIG. 5 illustrates an exemplary way that the RTP packetization component may map the NAL units that correspond to a particular slice into separate RTP packets.

The RTP packetization component 118 maps the NAL units 116 that correspond to a particular slice 114 to one or more RTP packets 120. There are several alternative approaches for doing this. These alternatives are illustrated in FIGS. 3-5. For ease of reference, the alternative that is depicted in FIG. 3 will be referred to as alternative A, the alternative that is depicted in FIG. 4 will be referred to as alternative B, and the alternative that is depicted in FIG. 5 will be referred to as alternative C.

In accordance with alternative A (shown in FIG. 3), the RTP packetization component 118 includes the different data partitions 122a, 122b, 122c that correspond to the same slice 114 in a single RTP packet 120. In particular, the RTP packet 120 includes the first NAL unit 116a comprising the coded data corresponding to data partition A 122a, the second NAL unit 116b comprising the coded data corresponding to data partition B 122b, and the third NAL unit 116c comprising the coded data corresponding to data partition C 122c. There are not any other data partitions that are included in the RTP packet 120.

In accordance with alternative B (shown in FIG. 4), the RTP packetization component 118 combines data partitions 122 corresponding to multiple slices 114 in the same RTP packet 120. In the example that is shown in FIG. 4, the NAL units 116a, 116b, 116c corresponding to a first slice 114a and the NAL units 116d, 116e, 116f corresponding to a second slice 114b are combined.

The NAL units 116a, 116b, 116c corresponding to the first slice 114a include a first NAL unit 116a comprising the coded data corresponding to data partition A 122a of the first slice 114a, a second NAL unit 116b comprising the coded data corresponding to data partition B 122b of the first slice 114a, and a third NAL unit 116c comprising the coded data corresponding to data partition C 122c of the first slice 114a. The NAL units 116d, 116e, 116f corresponding to the second slice 114b include a first NAL unit 116d comprising the coded data corresponding to data partition A 122d of the second slice 114b, a second NAL unit 116e comprising the coded data corresponding to data partition B 122e of the second slice 114b, and a third NAL unit 116f comprising the coded data corresponding to data partition C 122f of the second slice 114b.

In FIG. 4, the data partitions 116a, 116b, 116c, 116d, 116e, 116f corresponding to two slices 114a, 114b are combined into the same RTP packet 120. However, the selection of two slices 114a, 114b is for purposes of example only. The RTP packetization component 118 may under some circumstances combine data partitions 122 corresponding to more than two slices 114 in accordance with alternative B.

In accordance with alternative C (shown in FIG. 5), the RTP packetization component 118 includes the different data partitions 122a, 122b, 122c that correspond to the same slice 114 in separate RTP packets 120a, 120b, 120c. In particular, the first NAL unit 116a comprising the coded data corresponding to data partition A 122a is included in a first RTP packet 120a. The second NAL unit 116b comprising the coded data corresponding to data partition B 122b is included in a second RTP packet 120b. The third NAL unit 116c comprising the coded data corresponding to data partition C 122c is included in a third RTP packet 120c.

Figure 6:
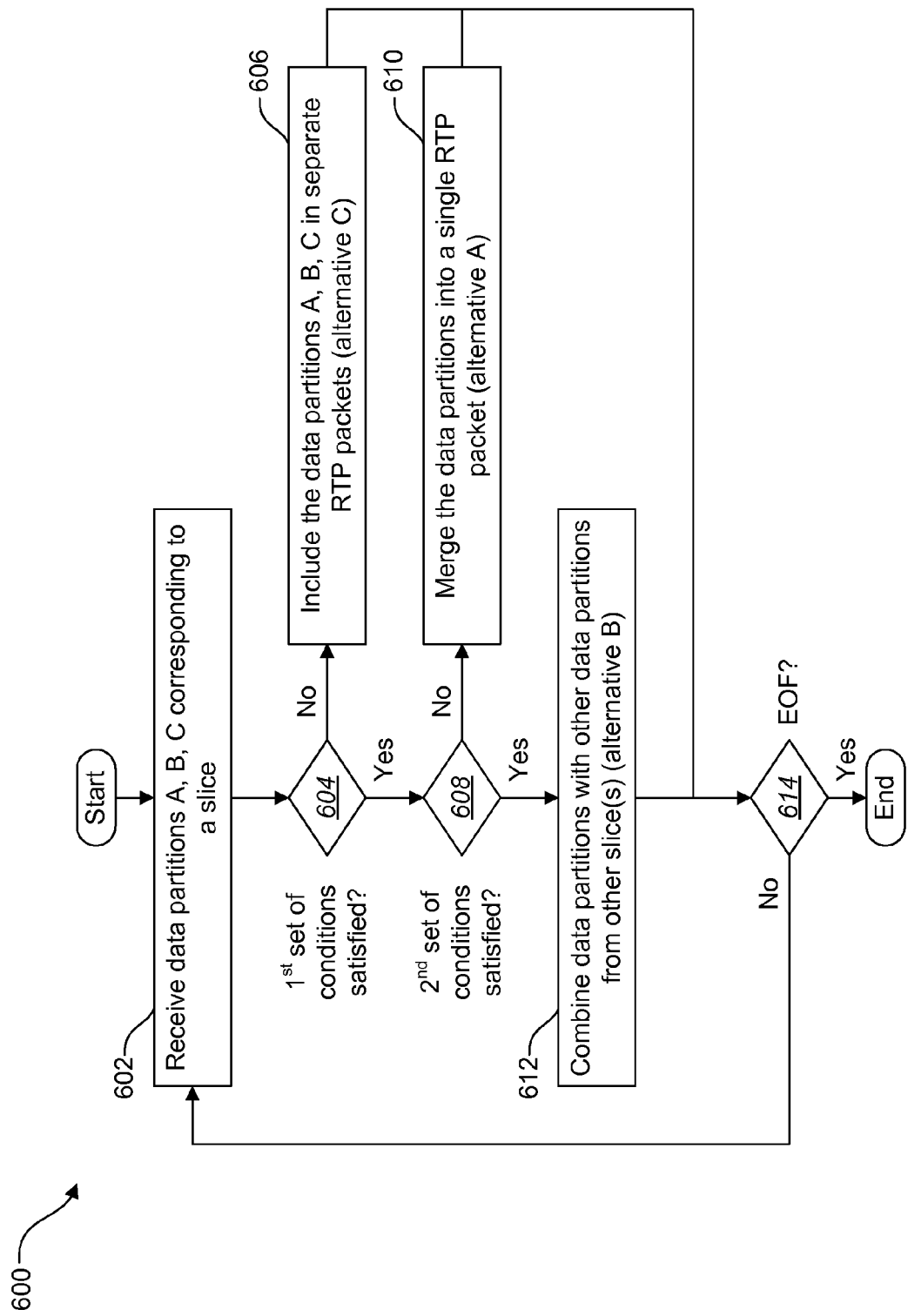
FIG. 6 illustrates an exemplary method that may be implemented by the RTP packetization component for the purpose of efficiently mapping data partitions into RTP packets.

FIG. 6 illustrates an exemplary method 600 that may be implemented by the RTP packetization component 118 in order to select between alternatives A, B, and C that were discussed above. In particular, FIG. 6 illustrates a method 600 that may be implemented by the RTP packetization component 118 for the purpose of adaptively packetizing data partitions 122 for transport over a network, e.g., mapping data partitions 122 into RTP packets 120. In the discussion of the method 600 that follows, it will be assumed that the H.264 encoder 104 is performing data partitioning.

In accordance with the depicted method 600, data partition A 122a, data partition B 122b, and data partition C 122c are received 602 from the H.264 encoder 104. These data partitions 122a, 122b, 122c each correspond to the same slice 114a of coded data. The data partitions 122a, 122b, 122c are included in three separate NAL units 116a, 116b, 116c. In particular, the coded data corresponding to data partition A 122a is included in a first NAL unit 116a, the coded data corresponding to data partition B 122b is included in a second NAL unit 116b, and the coded data corresponding to data partition C 122c is included in a third NAL unit 116c.

In response to receiving 602 data partition A 122a, data partition B 122b, and data partition C 122c, a decision is made about whether to merge these data partitions 122a, 122b, 122c into a single RTP packet 120, or to keep these data partitions 122a, 122b, 122c separate. This decision is made by evaluating 604 a set of conditions. This set of conditions will be referred to as a first set of conditions to distinguish it from another set of conditions that will be discussed below. (As used herein, the phrase "set of conditions" means one or more conditions. Thus, a set of conditions may include only one condition, or it may include more than one condition.)

In accordance with an embodiment, the first set of conditions relates to the size of data partition B 122b and the size of data partition C 122c. If data partition B 122b and data partition C 122c are sufficiently small, then the data partitions 122a, 122b, 122c may be merged. However, if data partition B 122b is too large and/or if data partition C 122c is too large, then the data partitions 122a, 122b, 122c are kept separate. A specific example of a first set of conditions that may be defined in accordance with the method 600 will be discussed below.

If it is determined 604 that any condition within the first set of conditions is not satisfied, then the data partitions 122a, 122b, 122c are included 606 in separate RTP packets 120a, 120b, 120c. In particular, the first NAL unit 116a comprising data partition A 122a is included in a first RTP packet 120a. The second NAL unit 116b comprising data partition B 122b is included in a second RTP packet 120b. The third NAL unit 116c comprising data partition C 122c is included in a third RTP packet 120c. This corresponds to alternative C that was discussed above.

However, if it is determined 604 that each condition in the first set of conditions is satisfied, then another decision is made, this time about whether to combine the data partitions 122a, 122b, 122c that were received in step 602 (which, as discussed above, each correspond to the same slice 114a) with other data partitions 122d, 122e, 122f that correspond to one or more other slices 114b. This decision is made by evaluating 608 another set of conditions, which will be referred to as a second set of conditions.

In accordance with an embodiment, the second set of conditions relates to the sum of the size of data partition A 122a, the size of data partition B 122b, and the size of data partition C 122c for the current slice 114a, as well as the sum of the size of data partition A 122d, the size of data partition B 122e, and the size of data partition C 122f for the next slice 114b that is received from the H.264 encoder 104. If the sum of the sizes of the data partitions 122a, 122b, 122c for the current slice 114a is sufficiently small, and if the sum of the sizes of the data partitions 122d, 122e, 122f for the next slice 114b is also sufficiently small, then these data partitions 122a, 122b, 122c, 122d, 122e, 122f may be combined within the same RTP packet 120. A specific example of a second set of conditions that may be defined will be discussed below.

If it is determined 608 that any condition within the second set of conditions is not satisfied, then the data partitions 122a, 122b, 122c that were received in step 602 are merged 610 into a single RTP packet 120. This corresponds to alternative A discussed above. However, if it is determined 608 that each condition in the second set of conditions is satisfied, then the data partitions 122a, 122b, 122c that were received in step 602 are combined 612 with other data partitions 122d, 122e, 122f from one or more other slices 114b. This corresponds to alternative B discussed above.

In response to the next set of data partitions 122d, 122e, 122f corresponding to the next slice 114b being received 602, the remaining steps 604-612 of the method 600 are repeated as described above. The method 600 continues in this manner until it is determined 614 that all of the coded data has been processed, at which point the method 600 ends.

There are several different types of RTP packets 120 that have been defined. The discussion that follows relates to which types of RTP packets 120 may be appropriate to use in connection with alternatives A, B, and C discussed above.

The RTP payload format for H.264 defines three different basic payload structures: a single NAL unit packet, an aggregation packet, and a fragmentation unit. The single NAL unit packet contains only a single NAL unit in the payload. The aggregation packet may be used to aggregate multiple NAL units into a single RTP payload. The aggregation packet exists in four versions, the Single-Time Aggregation Packet type A (STAP-A), the Single-Time Aggregation Packet type B (STAP-B), the Multi-Time Aggregation Packet (MTAP) with 16-bit offset (MTAP16), and the Multi-Time Aggregation Packet (MTAP) with 24-bit offset (MTAP24). The fragmentation unit may be used to fragment a single NAL unit over multiple RTP packets. There are two versions of the fragmentation unit, referred to as FU-A and FU-B.

A receiver can identify the payload structure by the first byte of the RTP payload, which co-serves as the RTP payload header and, in some cases, as the first byte of the payload. This byte is structured as a NAL unit header. The NAL unit type field indicates which structure is present.

In accordance with an embodiment, if alternative A is selected, the bits in data partition A, data partition B, and data partition C are combined to form a non-IDR coded slice (NAL unit type 1) which is indicated with NRI (nal_ref_idc) field binary value 10. If alternative B is selected, an aggregation packet is used, either a STAP-A aggregation packet or a STAP-B aggregation packet. If alternative C is selected, NAL units type 2, 3, and 4 (data partitions A, B, and C respectively) with NRI field binary value (10, 01, 01 respectively) are used.

Figure 7:
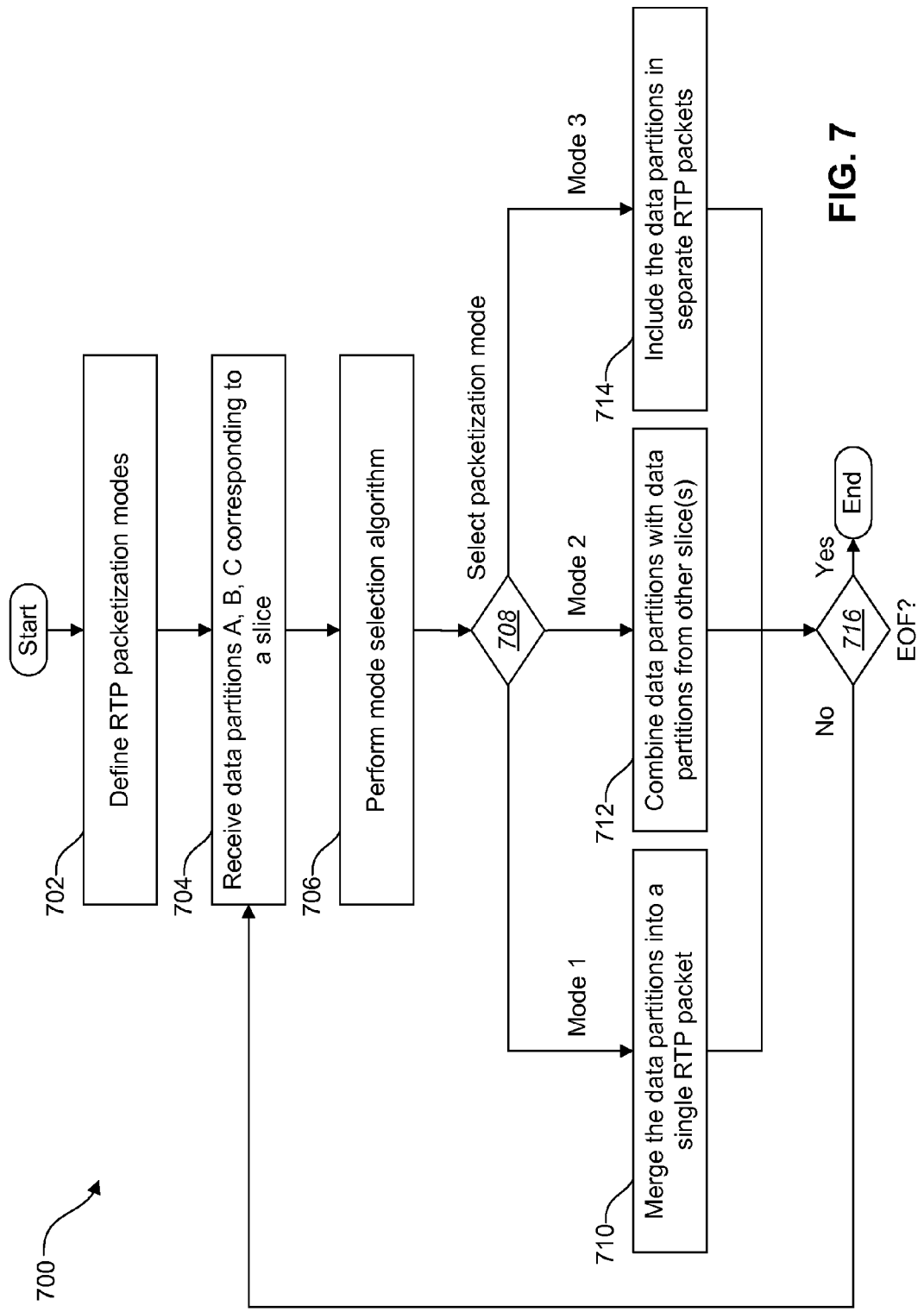
FIG. 7 illustrates another exemplary method that may be implemented by the RTP packetization component for the purpose of efficiently mapping data partitions into RTP packets.

FIG. 7 illustrates another method 700 that may be implemented by the RTP packetization component 118 for the purpose of efficiently packetizing data partitions 122 for transport over a network, e.g., mapping data partitions 122 into RTP packets 120. The method 700 that is shown in FIG. 7 may be thought of as a more specific implementation of the method 600 that was discussed above in connection with FIG. 6.

In accordance with the method 700 of FIG. 7, three RTP packetization modes are defined 702. These RTP packetization modes will be referred to as mode 1, mode 2, and mode 3. Mode 1 corresponds to alternative A discussed above. Mode 2 corresponds to alternative B discussed above. Mode 3 corresponds to alternative C discussed above.

In accordance with the depicted method 700, data partition A 122a, data partition B 122b, and data partition C 122c are received 704 from the H.264 encoder 104. These data partitions 122a, 122b, 122c each correspond to the same slice 114a of coded data. The data partitions 122a, 122b, 122c are included in three separate NAL units 116a, 116b, 116c. In particular, the coded data corresponding to data partition A 122a is included in a first NAL unit 116a, the coded data corresponding to data partition B 122b is included in a second NAL unit 116b, and the coded data corresponding to data partition C 122c is included in a third NAL unit 116c.

In response to receiving 704 the data partitions 122a, 122b, 122c, a mode selection algorithm is performed 706 for the purpose of selecting from mode 1, mode 2, or mode 3. There are a number of mode selection algorithms that may be performed 706 in accordance with the depicted method 700. Such mode selection algorithms may be based on the current bit-rate, frame-rate, frame-size packet statistics information, and so forth.

A description of an exemplary mode selection algorithm that may be performed 706 will now be provided. Let us consider the jth video frame FR(j) consisting of N slices sl(j)(0), sl(j)(1), . . . , sl(j)(N−1). Let the number of bytes within the data partitions corresponding to slice i in frame FR(j) be denoted by bA(j)(i), bB(j)(i), bC(j)(i) respectively. Then for frame FR(j):

```
if(bC(j) (i)<Threshold1)
{
    use Mode1;
}
else if(bB(j) (i)>Threshold2)
{
    use Mode3;
}
else
{
    use Mode3;
}
if(Mode1)
{
    if( ((bA(j) (i)+bB(j) (i)+bC(j) (i))<Threshold3) &&
        (bA(j) (i+1)+bB(j) (i+1)+bC(j) (i+1))<Threshold4)) &&
        (i!=N−1)
      )
    {
        use Mode2;
    }
    else
    {
        use Mode1;
    }
}
```

In accordance with the mode selection algorithm that is represented by the above pseudo-code, mode 3 (alternative C) is selected 708 if the size of data partition B 122b is greater than Threshold2. Even if the size of data partition B 122b is not greater than Threshold2, however, mode 3 is also selected 708 if the size of data partition C 122c is not less than Threshold1.

Either mode 1 (alternative A) or mode 2 (alternative B) is selected if the size of data partition C 122c is less than Threshold1. As between mode 1 and mode 2, mode 2 is selected 708 if the sum of the size of data partition A 122a for slice i, the size of data partition B 122b for slice i, and the size of data partition C 122c for slice i is less than Threshold3, and if the sum of the size of data partition A 122d for slice i+1, the size of data partition B 122e for slice i+1, and the size of data partition C 122f for slice i+1 is less than Threshold4. Otherwise, mode 1 is selected 708.

Different embodiments of the algorithm may use different thresholds, considering the video bit-rate. Other embodiments of the mode selection algorithm that is performed 706 in accordance with the depicted method 700 may use combinations of the above conditions to select the RTP packetization modes.

If mode 1 (alternative A) is selected 708, then the data partitions 122a, 122b, 122c that were received in step 704 are merged 710 into a single RTP packet 120. This single RTP packet 120 does not include data partitions corresponding to any other slices. If mode 2 (alternative B) is selected 708, the data partitions 122a, 122b, 122c that were received in step 704 are combined 712 with other data partitions 122d, 122e, 122f from one or more other slices 114b. If mode 3 (alternative C) is selected 708, then the data partitions 122a, 122b, 122c are included 714 in separate RTP packets 120a, 120b, 120c.

In response to the next set of data partitions 122d, 122e, 122f corresponding to the next slice 114b being received 704, the remaining steps 706-714 of the method 700 are repeated as described above unless Mode2 was used for the previous slice in which case this slice is already packetized so the process is repeated for the next unpacketized slice. The method 700 continues in this manner until it is determined 716 that all of the coded data has been processed, at which point the method 700 ends.

As indicated above, the method 700 that is shown in FIG. 7 may be thought of as a specific implementation of the method 600 that was discussed above in connection with FIG. 6. The following discussion illustrates how the method 700 of FIG. 7 implements the method 600 of FIG. 6.

The method 600 of FIG. 6 involves evaluating 604 a first set of conditions. If each condition within the first set of conditions is satisfied, then the data partitions 122a, 122b, 122c are merged into a single RTP packet 120. However, if any condition within the first set of conditions is not satisfied, then the data partitions 122a, 122b, 122c are included in separate RTP packets 120a, 120b, 120c. In the method 700 of FIG. 7, these steps are implemented as follows. In the method 700 of FIG. 7, either mode 1 or mode 2 is selected if data partition C 122c is smaller than Threshold1. Both mode 1 and mode 2 involve merging the data partitions 122a, 122b, 122c into a single RTP packet 120 (either by themselves or with data partitions 122d, 122e, 122f from one or more other slices 114b). Thus, this condition (i.e., that data partition C 122c is smaller than Threshold1) that is evaluated in the method 700 of FIG. 7 comprises an example of the first set of conditions that was discussed above in connection with the method 600 of FIG. 6.

The method 600 of FIG. 6 also involves evaluating 608 a second set of conditions (if each condition in the first set of conditions is satisfied). If it is determined 608 that any condition within the second set of conditions is not satisfied, then the data partitions 122a, 122b, 122c are merged 610 into a single RTP packet 120 that does not include data partitions corresponding to any other slices. However, if it is determined 608 that each condition in the second set of conditions is satisfied, then the data partitions 122a, 122b, 122c are combined 612 with data partitions 122d, 122e, 122f from one or more other slices 114b. In the method 700 of FIG. 7, these steps are implemented as follows. In the method 700 of FIG. 7, once it has been determined that either mode 1 or mode 2 will be used, mode 2 is selected 712 if the sum of the size of data partition A 122a for slice i, the size of data partition B 122b for slice i, and the size of data partition C 122c for slice i is less than Threshold3, and if the sum of the size of data partition A 122d for slice i+1, the size of data partition B 122e for slice i+1, and the size of data partition C 122f for slice i+1 is less than Threshold4. Thus, these conditions that are evaluated in the method 700 of FIG. 7 comprise an example of the second set of conditions that was discussed above in connection with the method 600 of FIG. 6.

Figure 8:
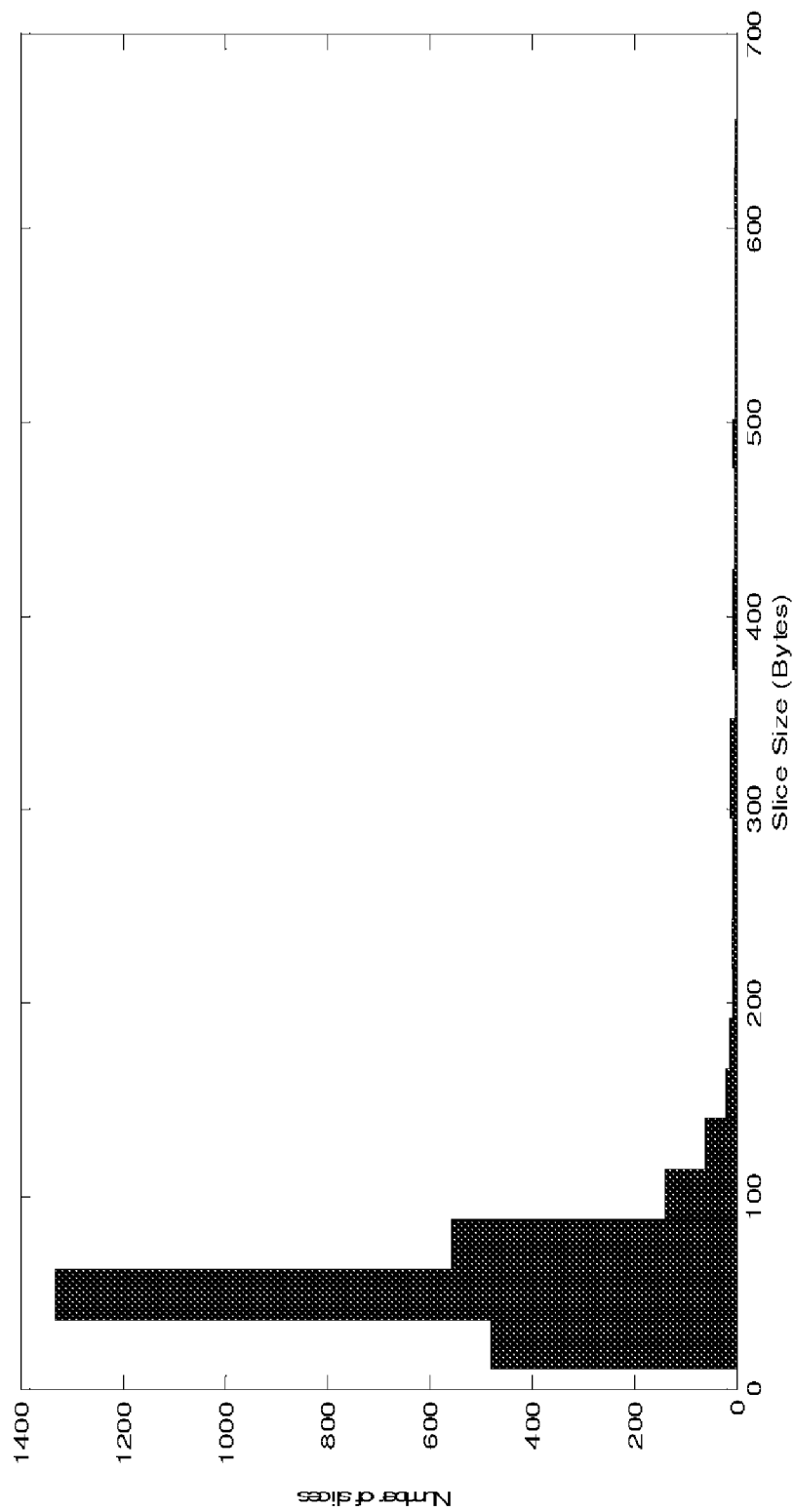
FIG. 8 shows simulation results that were obtained from a simulation of the method of FIG. 7.

A simulation of the method 700 of FIG. 7 was performed. FIG. 8 shows a plot of the size of slices for a H.264 bit-stream (Foreman) encoded at 144 Kbps, 30 fps, QCIF resolution. This sequence had the following statistics: 45% of the slices had a size less than 50 bytes, and 95% of the time the size of data partition B was less than or equal to 2 bytes. The percentage of savings for the above sequence was found to be 9.9% bytes when using the packetization method 700 of FIG. 7 compared to using a packetization method based on data partitioning.

Figure 9:
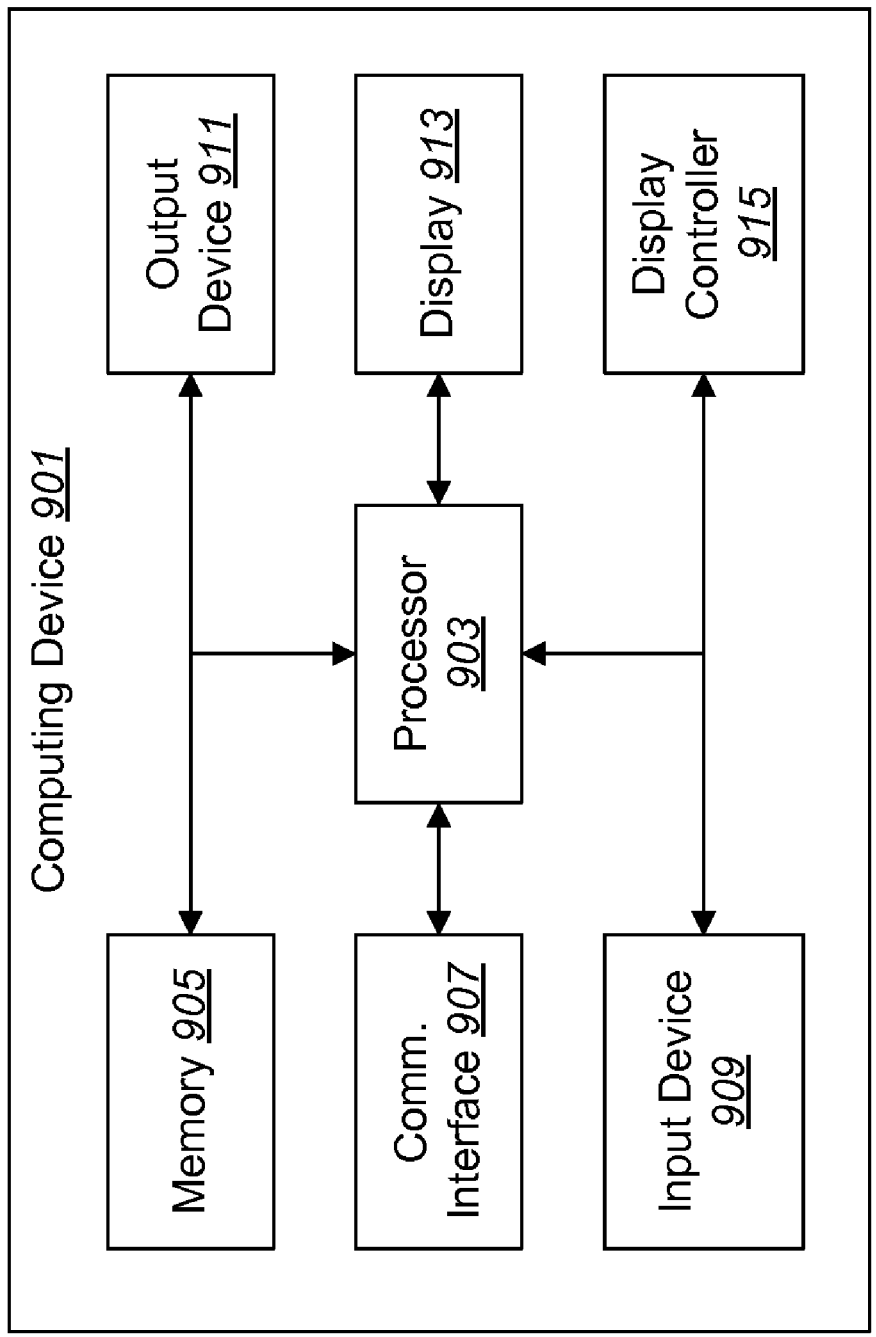
FIG. 9 illustrates various components that may be utilized in a computing device.

FIG. 9 illustrates various components that may be utilized in a computing device 901. The illustrated components may be located within the same physical structure or in separate housings or structures.

The computing device 901 includes a processor 903 and memory 905. The processor 903 controls the operation of the computing device 901 and may be embodied as a microprocessor, a microcontroller, a digital signal processor (DSP) or other device known in the art. The processor 903 typically performs logical and arithmetic operations based on program instructions stored within the memory 905.

The computing device 901 typically also includes one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 901 typically also includes one or more input devices 909 and one or more output devices 911. Examples of different kinds of input devices 909 include a keyboard, mouse, microphone, remote control device, button, joystick, trackball, touchpad, lightpen, etc. Examples of different kinds of output devices 911 include a speaker, printer, etc. One specific type of output device which is typically included in a computer system is a display device 913. Display devices 913 used with embodiments disclosed herein may utilize any suitable image projection technology, such as a cathode ray tube (CRT), liquid crystal display (LCD), light-emitting diode (LED), gas plasma, electroluminescence, or the like. A display controller 915 may also be provided, for converting data stored in the memory 905 into text, graphics, and/or moving images (as appropriate) shown on the display device 913.

Of course, FIG. 9 illustrates only one possible configuration of a computing device 901. Various other architectures and components may be utilized.

Additional information about H.264 is provided in "ITU-T Recommendation H.264, Advanced Video Coding For Generic Audiovisual Services" (ITU-T Rec. H.264/ISO/IEC 14 496-10 AVC), 2004. This document is hereby incorporated by reference in its entirety.

Additional information about RTP is provided in "RTP payload format for H.264 Video," RFC 3984. This document is hereby incorporated by reference in its entirety.

The embodiments discussed above have been described in terms of the H.264 video compression standard. However, the scope of the embodiments that are disclosed herein is not limited to the H.264 standard. Embodiments may be used in connection with any video compression technology that is capable of performing data partitioning.

The embodiments discussed above have also been described in terms of the Real-Time Transport Protocol (RTP). However, the scope of the embodiments that are disclosed herein is not limited to RTP. Embodiments may be used in connection with other transport mechanisms.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for adaptively packetizing data that is separated into slices in which data partitions are employed for transport over a network, wherein the method is performed by a device comprising a Real-Time Transport Protocol (RTP) packetization component, the method comprising:
    receiving a first set of data partitions, wherein the set of data partitions comprises:
    a first data partition, wherein the first data partition comprises header information;
    a second data partition, wherein the second data partition comprises Intra Coded Block Patterns (CBPs) and transform coefficients of I-blocks; and a third data partition, wherein the third data partition comprises Inter CBPs and coefficients of P-blocks;
    wherein data partitions allow the use of unequal error protection, and wherein the first set of data partitions correspond to a first single slice of coded data;
    evaluating a first set of conditions, wherein the first set of conditions comprises evaluating whether a number of bytes within one data partition is less than a first threshold value, wherein the one data partition used in the first set of conditions is either the second data partition or the third data partition;
    including the first set of data partitions in separate packets for transport over the network if any condition within the first set of conditions is not satisfied;
    evaluating a second set of conditions if each condition in the first set of conditions is satisfied, wherein the second set of conditions comprises: evaluating whether a total number of bytes within the first set of data partitions is less than a second threshold value; and
    evaluating whether a total number of bytes within a second set of data partitions is less than a third threshold, wherein the second set of data partitions correspond to a second single slice of coded data:
    merging the first set of data partitions into a single packet for transport over the network if any condition in the second set of conditions is not satisfied; and
    combining the first set of data partitions with the second set of data partitions into a single packet for transport over the network if each condition in the second set of conditions is satisfied.

2. The method of claim 1,
    wherein the header information comprises macroblock types, quantization parameters and motion vectors.

3. The method of claim 1, wherein the second set of data partitions correspond to two or more slices of coded data.

4. The method of claim 1, wherein merging the data partitions into a single packet comprises combining the first data partition, the second data partition and the third data partition to form a non-IDR coded slice.

5. The method of claim 1, wherein the first set of conditions is evaluated in response to receiving the first set of data partitions.

6. The method of claim 1, wherein the first set of data partitions is received from an encoder.

7. The method of claim 6, wherein the encoder is an H.264 encoder.

8. The method of claim 1 wherein each data partition is contained within a separate Network Abstraction Layer (NAL) unit.

9. The method of claim 1, wherein the single packet and the separate packets are each Real-Time Transport Protocol (RTP) packets.

10. A computer-readable medium comprising executable instructions for implementing a method for adaptively packetizing data that is separated into slices in which data partitions are employed for transport over a network, the method comprising:
receiving a first set of data partitions, wherein the set of data partitions comprises:
a first data partition, wherein the first data partition comprises header information;
a second data partition, wherein the second data partition comprises Intra Coded Block Patterns (CBPs) and transform coefficients of I-blocks; and
a third data partition, wherein the third data partition comprises Inter CBPs and coefficients of P-blocks;
wherein data partitions allow the use of unequal error protection, and wherein the first set of data partitions correspond to a first single slice of coded data;
evaluating a first set of conditions, wherein the first set of conditions comprises evaluating whether a number of bytes within one data partition is less than a first threshold value, wherein the one data partition used in the first set of conditions is either the second data partition or the third data partition;
including the first set of data partitions in the separate packets for transport over the network if any condition within the first set of conditions is not satisfied;
evaluating a second set of conditions if each condition in the first set of conditions is satisfied, wherein the second set of conditions comprises: evaluating whether a total number of bytes within the first set of data partitions is less than a second threshold value; and
evaluating whether a total number of bytes within a second set of data partitions is less than a third threshold, wherein the second set of data partitions correspond to a second single slice of coded data;
merging the first set of data partitions into a single packet for transport over the network if any condition in the second set of conditions is not satisfied; and
combining the first set of data partitions with the second set of data partitions into a single packet for transport over the network if each condition in the second set of conditions is satisfied.

11. The computer-readable medium of claim 10, wherein the header information comprises macroblock types, quantization parameters and motion vectors.

12. The computer-readable medium of claim 10, wherein the second set of data partitions correspond to two or more slices of coded data.

13. The computer-readable medium of claim 10, wherein merging the data partitions into a single packet comprises combining the first data partition, the second data partition and the third data partition to form a non-IDR coded slice.

14. The computer-readable medium of claim 10, wherein the first set of data partitions is received from an encoder.

15. A computing device that is configured to implement a method for adaptively packetizing data that is separated into slices in which data partitions are employed for
transport over a network, the computer system comprising:
a processor; memory in electronic communication with the processor;
instructions stored in the memory, the instructions being executable to:
receive a first set of data partitions, wherein the set of data partitions comprises:
a first data partition, wherein the first data partition comprises header information;
a second data partition, wherein the second data partition comprises Intra Coded Block Patterns (CBPs) and transform coefficients of I-blocks; and a third data partition, wherein the third data partition comprises Inter CBPs and coefficients of P-blocks;
wherein data partitions allow the use of unequal error protection, and wherein the first set of data partitions correspond to a first single slice of coded data;
evaluate a first set of conditions, wherein the first set of conditions comprises evaluating whether a number of bytes within one data partition is less than a first threshold value, wherein the one data partition used in the first set of conditions is either the second data partition or the third data partition;
include the first set of data partitions in separate packets for transport over the network if any condition within the first set of conditions is not satisfied;
evaluate a second set of conditions if each condition in the first set of conditions is satisfied, wherein the second set of conditions comprises: evaluating whether a total number of bytes within the first set of data partitions is less than a second threshold value; and
evaluating whether a total number of bytes within a second set of data partitions is less than a third threshold, wherein the second set of data partitions correspond to a second single slice of coded data; merge the first set of data partitions into a single packet for transport over the network if any condition in the second set of conditions is not satisfied; and
combine the first set of data partitions with the second set of data partitions into a single packet for transport over the network if each condition in the second set of conditions is satisfied.

16. The computing device of claim 15, wherein the header information comprises macroblock types, quantization parameters and motion vectors.

17. The computing device of claim 15, wherein the second set of data partitions correspond to two or more slices of coded data.

18. The method of claim 1, wherein combining the first set of data partitions with the second set of data partitions uses an aggregation packet.

19. The method of claim 1, wherein including the first set of data partitions in separate packets uses Network Abstraction Layer (NAL) units type 2, 3 and 4.

* * * * *